US012525719B2

(12) United States Patent
Lai et al.

(10) Patent No.: US 12,525,719 B2
(45) Date of Patent: Jan. 13, 2026

(54) COUPLING STRUCTURE, RESONANT STRUCTURE, LOW-FREQUENCY RADIATION UNIT, ANTENNA AND ELECTROMAGNETIC BOUNDARY

(71) Applicants: Comba Telecom Technology (Guangzhou) LTD., Guangdong (CN); Comba RF Technology (Guangzhou) LTD, Guangdong (CN)

(72) Inventors: Zhanjun Lai, Guangdong (CN); Zhilun Zheng, Guangdong (CN); Mingchao Li, Guangdong (CN); Guosheng Su, Guangdong (CN); Jiaju Liang, Guangzhou Guangdong (CN); Peitao Liu, Guangzhou Guangdong (CN); Qiang Wang, Guangzhou Guangdon (CN)

(73) Assignees: Comba Telecom Technology (Guangzhou) LTD., Guangdong (CN); Comba RF Technology (Guangzhou) LTD, Guangdong (CN)

( * ) Notice: Subject to any disclaimer, the term of this patent is extended or adjusted under 35 U.S.C. 154(b) by 283 days.

(21) Appl. No.: 18/269,911

(22) PCT Filed: Aug. 12, 2021

(86) PCT No.: PCT/CN2021/112250
§ 371 (c)(1),
(2) Date: Jun. 27, 2023

(87) PCT Pub. No.: WO2022/142361
PCT Pub. Date: Jul. 7, 2022

(65) Prior Publication Data
US 2024/0250438 A1 Jul. 25, 2024

(30) Foreign Application Priority Data
Dec. 31, 2020 (CN) ........................ 202011642461.0

(51) Int. Cl.
*H01Q 9/28* (2006.01)
*H01P 1/203* (2006.01)
*H01Q 21/26* (2006.01)

(52) U.S. Cl.
CPC ......... *H01Q 9/285* (2013.01); *H01P 1/20381* (2013.01); *H01Q 21/26* (2013.01)

(58) Field of Classification Search
CPC .... H01Q 9/285; H01Q 21/26; H01P 1/20381; H01P 3/026; H01P 5/12; H01L 23/5223
See application file for complete search history.

(56) References Cited

U.S. PATENT DOCUMENTS

2003/0030589 A1* 2/2003 Zurcher ................. G04G 21/04 343/718
2005/0270243 A1* 12/2005 Caimi .................... H01Q 5/321 343/702
(Continued)

FOREIGN PATENT DOCUMENTS

CN 101271992 A 9/2008
CN 201466197 U 5/2010
(Continued)

OTHER PUBLICATIONS

Supplementary European Search Report in EP patent Application No. 21913109.1 issued Jun. 5, 2024.
(Continued)

*Primary Examiner* — Hai V Tran
(74) *Attorney, Agent, or Firm* — Ladas & Parry, LLP

(57) ABSTRACT

The present disclosure provides a coupling structure and a resonant structure, a low frequency radiation unit, an antenna and an electromagnetic boundary to which the coupling structure is applied. The coupling structure includes at least two layers of conductors in a capacitive coupling relationship, each layer of conductors including a plurality of conductor strips side by side and having a gap,
(Continued)

at least one of the plurality of conductor strips of the same layer having an electrical potential difference from an adjacent conductor strip during operation, and between the conductor strips of two different layers, at least one of the conductor strips of one layer having an electrical potential difference with at least one of the conductor strips of the other layer and the conductor strips of two different layers at least partially overlap in a direction of a mutual projection with each other.

17 Claims, 9 Drawing Sheets

(56) References Cited

U.S. PATENT DOCUMENTS

| | | | | |
|---|---|---|---|---|
| 2006/0125578 | A1* | 6/2006 | Akale | H01P 1/20381 333/204 |
| 2007/0215928 | A1* | 9/2007 | McLeod | H10D 1/042 257/306 |
| 2007/0296013 | A1* | 12/2007 | Chang | H10D 1/692 257/E27.048 |
| 2008/0048797 | A1 | 2/2008 | Matters-Kammerer et al. | |
| 2011/0133860 | A1* | 6/2011 | Fukamachi | H03H 7/09 333/204 |
| 2016/0005531 | A1* | 1/2016 | Sullivan | H01F 17/0013 336/200 |
| 2016/0226144 | A1 | 8/2016 | Martiskainen et al. | |

FOREIGN PATENT DOCUMENTS

| | | | |
|---|---|---|---|
| CN | 107735903 | A | 2/2018 |
| CN | 109638460 | A | 4/2019 |
| CN | 112787061 | A | 5/2021 |
| CN | 213989160 | U | 8/2021 |
| EP | 0933831 | A1 | 8/1999 |
| WO | 2010018798 | A1 | 2/2010 |
| WO | 2014088635 | A1 | 6/2014 |

OTHER PUBLICATIONS

International Search Report for PCT/CN2021/112250 mailed Nov. 3, 2021. 3 pages.

Wang, Y. et al. "A Compact SISL Balun Using Compensated Interdigital Capacitor" 1-6. 8-10, IEEE Microwave and Wireless Components Letters, Aug. 2017, vol. 27. No. 9., pp. 797-799.

Stepinski, T et al. "Interdigital Transducers in Structural Health Monitoring Based on 7. 11-19, Lamb Waves—A State of the Art", Sensors and Smart Structures Technologiesj (Jr Civil, Mechanical, and Aerospace Systems}, Apr. 2016, vol. 27, No. 9, 30 pp. 2, 8. 16 pgs.

Search Report dated Feb. 26, 2024 from Office Action for Chinese Application No. 202011642461.0 issued Feb. 28, 2024. 3 pgs.

* cited by examiner

COUPLING STRUCTURE, RESONANT STRUCTURE, LOW-FREQUENCY RADIATION UNIT, ANTENNA AND ELECTROMAGNETIC BOUNDARY

CROSS-REFERENCE TO RELATED APPLICATIONS

The present disclosure is a U.S. National Phase Application of PCT/CN2021/112250 filed on Aug. 12, 2021, which claims priority to Chinese Patent Application No. 202011642461.0, filed with the China National Intellectual Property Administration (CNIPA) on Dec. 31, 2020, the entirety of these disclosures are incorporated herein by reference.

TECHNICAL FIELD

The present disclosure relates to the technical field of mobile communications and, in particular, to a coupling structure and a resonant structure, radiation unit, low frequency antenna and electromagnetic boundary to which the coupling structure is applied.

BACKGROUND

With the development of mobile communication systems, products and components for communication systems such as base station antennas and filters, combiners and duplexers have also developed rapidly. Coupling structures are often used in the feed structure of antenna radiation units, radiation arms, electromagnetic boundaries, and transmission lines with filtering characteristics.

It is well known that the coupling amount in a coupling structure (generally referred to as capacitance in the case of capacitive coupling structures) is proportional to the amount of charge and is also related to the overlapping area of the polar plates with an electrical potential difference. Referring to FIG. 1, which shows the schematic diagram of a conventional coupling structure, it can be seen that the electric field in the coupling structure is directed from the conductor with a high electrical potential (positive charge) to the conductor with a low electrical potential (negative charge) and that the charge is mainly concentrated on a lower surface of the upper conductor and the upper surface of the lower conductor. Thus, in order to achieve large coupling amounts, wider microstrip lines or metal layers are used to form the coupling structure wherever possible, or multi-layer metal-to-metal coupling is used to achieve the required coupling amount.

However, when the coupling structure is used in an antenna, for example in a radiation unit as a radiation arm, the coupling structure formed by the wide microstrip lines (or metal layers) has a large area, and while providing sufficient coupling amount, it tends to generate strong induced currents when other radiation units placed by the neighbor are in operation, thus affecting the performance index of other radiation units placed by the neighbor.

The use of multi-layer PCBs to produce coupling devices to achieve the required large coupling amount is a more complex and costly process.

SUMMARY

It is a primary object of the present disclosure to provide a coupling structure that is simple in structure and can facilitate a reduction in size based on the provision of the required coupling amount.

It is a further object of the present disclosure to provide a resonant structure employing the above coupling structure.

It is a further object of the present disclosure to provide a low frequency radiation unit employing the above resonant structure.

It is a further object of the present disclosure to provide an antenna employing the above radiation unit.

It is a further object of the present disclosure to provide an electromagnetic boundary employing the above resonant structure.

In order to achieve the above objects, the present disclosure provides the following technical solutions:

In a first aspect, there is provided a coupling structure including at least two layers of conductors having a capacitive coupling relationship, each layer of conductors including a plurality of conductor strips side by side and having a gap, at least one of the plurality of conductor strips of the same layer having an electrical potential difference from an adjacent conductor strip during operation, between the conductor strips of two different layers, at least one of the conductor strips of one of the two different layers having an electrical potential difference from at least one of the conductor strips of the other layer, and the two different layers at least partially overlap in a direction of mutual projection with each other.

Optionally, the conductor strips of each layer of conductors operate at both a high electrical potential and low electrical potential, the high electrical potential and low electrical potential are relative electrical potentials, with part of the conductor strips operating at the high electrical potential and the other part of the conductor strips having a coupling relationship with them operating at the low electrical potential.

Optionally, the conductor strip operating at the high electrical potential is connected to one conductor section, and the conductor strip operating at the low electrical potential is connected to another conductor section.

Further, the coupling structure further includes a dielectric plate, each layer of the conductor being laminated in a thickness direction of the dielectric plate, the two conductor sections being provided on a surface of the dielectric plate, the conductor sections being integrally formed with a conductor strip located on the same layer thereof and operating at the same electrical potential, the conductor strip located on two different layers thereof being electrically connected to the conductor sections via a plated through hole.

Optionally, two of the conductor sections are disposed at two ends of the conductor strip.

Optionally, there is an electrical potential difference between every two adjacent conductor strips operating at different electrical potentials respectively in the plurality of conductor strips of the same layer.

Optionally, in the conductor strips of the same layer, at least two conductor strips operating at one electrical potential are provided between two conductor strips operating at another electrical potential.

Optionally, the number of conductor strips operating at a high electrical potential is the same as or different from the number of conductor strips operating at a low electrical potential.

Optionally, along a lamination direction of the layers of conductor strips, the sum of the projected areas of the conductor strips is greater than the sum of the projected areas of the gaps between the conductor strips.

Optionally, for a same layer of conductors, the sum of widths of the conductor strips is greater than the sum of widths of the gaps between the conductor strips.

As a second aspect, the present disclosure relates to a resonant structure including a capacitor and an inductor, the capacitor being connected in series or in parallel with the inductor, wherein the capacitor is composed of the above coupling structures.

Optionally, the inductor includes a folded-type conductor or a wraparound-type conductor provided on a dielectric substrate.

As a third aspect, the present disclosure relates to a low frequency radiation unit including a radiation arm, the radiation arm including a resonant structure as described above.

Optionally, the radiation arm is a ring-shaped radiation arm formed by jointing a plurality of the resonance structures.

As a fourth aspect, the present disclosure relates to an antenna including a low frequency radiation unit, the low frequency radiation unit being a low frequency radiation unit as described above.

Further, the antenna further includes a high frequency radiation unit, the high frequency radiation unit being provided between the two adjacent low frequency radiation units, and/or, the high frequency radiation unit being provided between the two adjacent radiation arms of the low frequency radiation unit.

Further, the antenna further includes an electromagnetic boundary, the electromagnetic boundary being provided around the low frequency radiation unit.

Optionally, the electromagnetic boundary is composed by jointing a plurality of the resonant structures.

As a fourth aspect, the present disclosure relates to an electromagnetic boundary for being provided between the radiation units to avoid interference between the radiation units, the electromagnetic boundary including the resonant structures.

The technical solution provided by the present disclosure brings the following beneficial effect:

1. In the coupling structure of the present disclosure, by separating a plurality of conductor strips on each layer of the conductor having a coupling relationship between the two layers, and by making the conductor strips operate with an electrical potential difference from the conductor strips located in the same layer and adjacent to each other, the electric field direction can have two paths from the conductor strip with a high electrical potential to the conductor strip with a low electrical potential in the same layer and from the conductor strip with a high electrical potential to the conductor strip with a low electrical potential in another layer, the conductor strips carry more charges, this allows a larger coupling amount to be achieved, i.e. the coupling structure of the present disclosure has a smaller size when the same coupling amount is achieved.
2. In the coupling structure of the present disclosure, conductor strips operating at the same electrical potential are connected to one conductor section, and conductor strips operating at another electrical potential are connected to another conductor section, and this is shown by the fact that the conductor strips located on the same layer are integrally formed and the conductor strips located on two different layers from the conductor section are connected to the conductor section via a plated through hole, so that only two conductor sections are required to apply the voltage to all the conductor strips to form a coupling relationship. The structure is relatively simple.
3. The resonant structure of the present disclosure has the advantage of a coupling structure due to the use of the coupling structure described above. In its disclosure to the radiation arm of the radiation unit, the resonant structure can be used to achieve a lower resonant frequency when the radiation arm size and the dielectric material are the same.
4. In the radiation unit of the present disclosure, since the above resonant structure is applied, the size of the radiation arm is smaller when the same resonant frequency is achieved, which facilitates the miniaturization of the antenna.
5. In the antenna of the present disclosure, the antenna size is smaller and the radiation performance is better since the above radiation unit is applied.
6. In the electromagnetic boundary of the present disclosure, since the above resonant structure is applied, it has bandpass characteristics in the low frequency band and high resistance characteristics in the high frequency band, which can be applied to the dual frequency antenna to improve the performance of the low frequency oscillator, while weakening the impact on the high frequency oscillator.

BRIEF DESCRIPTION OF THE DRAWINGS

In order to explain the technical solutions in the embodiments of the present disclosure more clearly, the drawings to be used in the description of the embodiments of the present disclosure will be briefly illustrated below.

DETAILED DESCRIPTION

Figure 1:
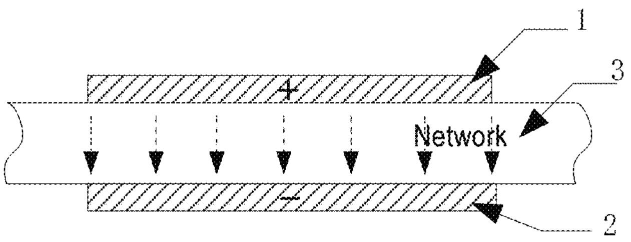
FIG. 1 shows an electromagnetic schematic diagram of a conventional coupling structure.

Embodiments of the present disclosure will be described in more detail below with reference to the accompanying drawings. Although certain embodiments of the present disclosure are shown in the accompanying drawings, it should be understood, however, that the present disclosure may be implemented in various forms and should not be construed as being limited to the embodiments set forth herein, but rather are provided for a more thorough and complete understanding of the present disclosure. It should be understood that the accompanying drawings and embodiments of the present disclosure are intended to be exemplary only and are not intended to limit the scope of protection of the present disclosure.

It should be understood that the individual steps documented in the method embodiments of the present disclosure may be performed in a different order, and/or in parallel. Furthermore, the method embodiments may include additional steps and/or omit the execution of the steps illustrated. The scope of the present disclosure is not limited in this respect.

As used herein, the term "including" and variations thereof are open-ended, i.e., "including but not limited to". The term "connection" may be a direct connection or an indirect connection via an intermediate component (element). The term "an embodiment" means "at least one embodiment": the term "another embodiment" means "at least one additional embodiment": the term "another embodiment" means "at least one another embodiment", the term "some embodiments" indicates "at least some embodiments". Relative definitions of other terms will be given in the description below.

It is to be noted that the concepts "first", "second", etc., referred to in the present disclosure are used only to distinguish devices, modules or units and are not intended to define them as necessarily different devices, modules or units, nor are they intended to define the order or interdependence of the functions performed by these devices, modules or units.

Referring to FIGS. 2 to 8, as a first aspect, the present disclosure relates to a coupling structure 10, which mainly reflects capacitive coupling characteristics and can be used as a capacitor alone or connected with an inductive element to form an LC resonant structure, suitable for use in the feed structure of base station antennas, the radiation arm of radiation units and electromagnetic boundaries, for reducing the size of the coupling structure on the premise of providing the required coupling amount, which in turn facilitates the miniaturization design of the antenna. In addition, the coupling structure mainly reflects the capacitive characteristics when used in the LC resonant structure, which allows the resonant structure to have a relatively lower resonant frequency, a low frequency bandpass, and a high frequency band resistance characteristic, which enhances the radiation performance of the multi-frequency antenna.

The coupling structure 10 includes at least two layers of conductors, the two adjacent layers of conductors are arranged in a cascading manner, so that when the voltage is applied to the adjacent two layers of conductors, the two layers of conductors have an electrical potential difference between the two layers of conductors and form a capacitance, that is, there is a capacitive coupling relationship.

The at least two layers of conductors may be supported by a dielectric plate 3, when the conductors are provided with two layers, the two layers of conductors are provided on the front and back sides of the dielectric plate: when the conductors are provided with three or more layers, the dielectric plate is a multilayer dielectric plate, the multilayer conductors are stacked in layers along the thickness direction of the dielectric plate, two of the layers of conductors are provided on the two outermost surfaces of the dielectric plate.

The conductors may also be supported by means of a dielectric support in point contact with the conductors, with the conductors on the upper layer being disposed in suspension with respect to the conductor on the lower layer.

The conductors are thus arranged in layers so that a coupling gap is formed between the two different layers of conductors and a coupling relationship can be formed between the two different layers of conductors when a voltage is applied.

The following is an example of the coupling structure 10 with two layers of conductors 1 and 2 to illustrate the specific structure and working principle of the coupling structure of the present disclosure.

The coupling structure includes two layers of conductors 1, 2 and a dielectric plate 3, the two layers of conductors 1, 2 being disposed on the front and the back side of the dielectric plate 3. Each layer of conductors includes a plurality of conductor strips, the plurality of conductor strips being arranged side by side and having a gap between them: between the conductor strips of two adjacent layers of conductors, the mutual projection of the upper conductor strip and the lower conductor strip at least partially overlaps.

In one specific embodiment, the plurality of conductor strips of each layer of conductors operate at high and low electrical potentials, with high and low electrical potentials being electrical potentials with an electrical potential differences, and when a voltage is applied to the conductor strips, i.e. when the conductor strips operate, a part of the conductor strips are at a high electrical potential and the other part of the conductor strips are at a low electrical potential, so that an electric field from the high electrical potential to the low electrical potential can be formed, i.e. a coupling relationship is formed between the conductor strips of the same layer.

Between two adjacent layers of conductor strips, a plurality of conductor strips in the upper layer and a plurality of conductor strips in the lower layer are disposed opposite to each other and their projections coincide with each other, and a conductor strip in the upper layer is opposite in electrical potential to a corresponding conductor strip in the lower layer, so that an electric field in which the electrical potential pointed from the high electrical potential to the low electrical potential is formed between every two corresponding conductor strips of the two different layers.

Figure 3:
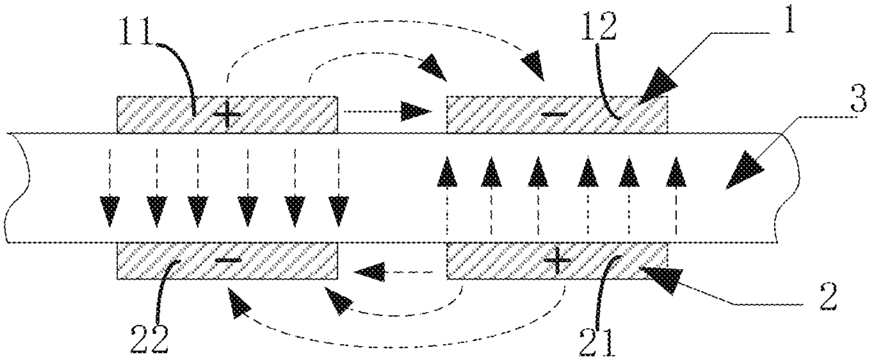
FIG. 3 shows an A-A oriented cross-sectional view of the coupling structure shown in FIG. 2*b*, illustrating the pointing of the electric field during operation of the coupling structure.

Combining with FIG. 3, in FIG. 3, the high electrical potential is indicated by the "+" sign and the low electrical potential is indicated by the "−" sign. In this embodiment, the coupling structure has four conductor strips, each layer has two conductor strips. Conductor strip 11 and conductor strip 12 are located on the front side of the dielectric plate 3, conductor strip 21 and conductor strip 22 are located on the back side of the dielectric plate 3, and the two conductor strips on the same side are separated by a gap.

In the two conductor strips of the same layer, for the conductor strip 11 and the conductor strip 12 on the front side of the dielectric plate 3, the conductor strip 11 is positively charged and has a high electrical potential, and the conductor strip 12 is negatively charged and has a low electrical potential: for the conductor strip 21 and the conductor strip 22 on the back side of the dielectric plate, the conductor strip 21 is positively charged and has a high electrical potential, and the conductor strip 22 is negatively charged and has a low electrical potential, so that the two conductor strips of the same layer have opposite electrical potentials due to the different charges they carry and have an electrical potential difference, thus an electric field in which the high electrical potential conductor strip is pointed to the low electrical potential conductor strip is formed.

Between the two conductor strips of different layers, conductor strip 11 and conductor strip 22 are facing each other and have opposite electrical potentials, and conductor strip 12 and conductor strip 21 are facing each other and have opposite electrical potentials, thus an electric field in which the high electrical potential conductor strip is pointed to the low electrical potential conductor strip is formed between the two different layers of conductor strips.

As can be seen from the figures, the path of the electric field from the high electrical potential conductor strips to the low electrical potential conductor strips in the above example coupling structure includes a path located inside the dielectric plate and a path located on the surface of the dielectric plate, allowing both the front and the back side of the conductor strip to carry charge, which can carry more charge and thus have a greater coupling capacitance compared to the conventional coupling structure.

Figure 4:
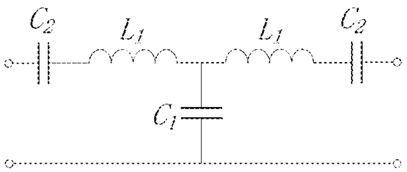
FIG. 4 shows an equivalent circuit diagram of the coupling structure shown in FIG. 2*b:*
Figure 5:
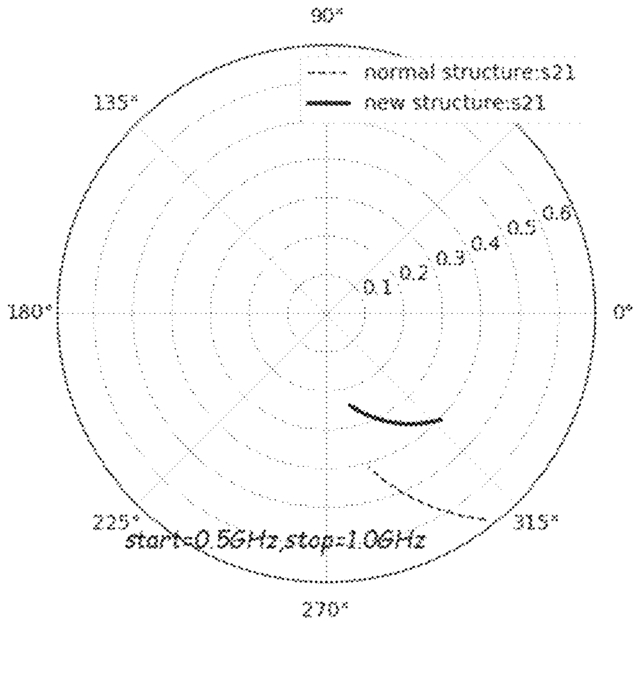
FIG. 5 shows a simulation of the coupling structure of the present disclosure with the two-port $S_{21}$ parameters of the conventional coupling structure.
Figure 6:
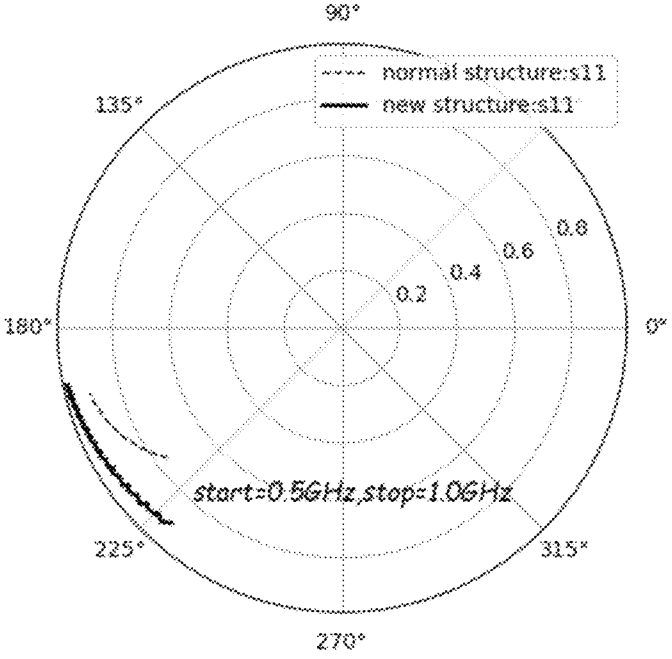
FIG. 6 shows a simulation of the coupling structure of the present disclosure with the single port $S_{11}$ parameters of the conventional coupling structure.

FIG. 4 shows an equivalent circuit diagram of the coupling structure provided in the present disclosure, illustrating the coupling amount of the above coupling structure with both capacitance C1 and C2, increasing the coupling amount of C2 relative to the conventional coupling structure. In order to compare the size of the coupling amount of the coupling structure of the present disclosure with that of the conventional coupling structure, the above coupling structure and the conventional coupling structure with the same projection dimensions (same 20 $cm^2$) are used and simulated for the two-port $S_{21}$ parameter and the single-port $S_{11}$ parameter, forming the simulation diagrams for the two-port $S_{21}$ parameter and the single-port $S_{11}$ parameter of the coupling structure shown in FIG. 5 and FIG. 6, in addition: according to the corresponding equivalent circuit, the parameter values shown in Table 1 can be calculated.

TABLE 1

| Parameter value of the equivalent circuit | | | |
|---|---|---|---|
| | Inductance $L_1$ (nH) | capacitance $C_1$ (pF) | capacitance $C_2$ (pF) |
| Conventional surface coupling structure | 0.63 | 14.5 | / |
| Two-layer cross-coupling structure of the present disclosure | 1.1 | 25.3 | 23.2 |

Note:
The equivalent values of inductance and capacitance in this table apply to equivalentcircuits up to 1 GHz As can be seen from the parameter values of the equivalent circuit, with the same projection dimensions, the coupling amount of the conventional surface coupling structure has only capacitance C1, while the coupling amount of the coupling structure of the present disclosure has capacitance C1 and capacitance C2. The coupling structure of the present disclosure has a higher capacitance than the conventional coupling structure and has a better coupling effect, this characteristic helps to improve the conduction characteristics of the coupling structure in high frequency applications. This characteristic can also be equivalently described as: the new coupling structure can have a smaller size if the design requires the same value of capacitance, this characteristic facilitates the miniaturization of the device.

Figure 7:
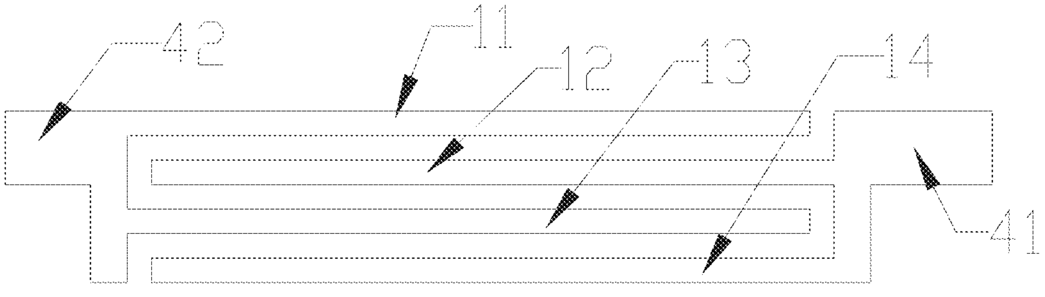
FIG. 7 shows a structural schematic of the coupling structure of another embodiment of the present disclosure, illustrating a plurality of conductor strips of a single layer of conductors and their interrelationships.

When a larger coupling amount is required, this can be achieved by having more conductor strips on each layer. Referring to FIG. 7, this embodiment is an extension of the above embodiment, where each layer of conductors has four conductor strips, for example four conductor strips of one layer of conductors, where two conductor strips 11, 13 operate at the high electrical potential and the other two conductor strips 12, 14 operate at the low electrical potential, and where the four conductor strips are arranged in an alternating manner with an electrical potential difference so that a coupling relationship is formed between every two adjacent conductor strips of the same layer. A greater amount of coupling can be achieved.

In addition, the number of conductor strips operating at the two electrical potentials may be equal or unequal, in one embodiment, there are more conductor strips operating at one electrical potential than the conductor strips operating at the other electrical potential to achieve a specific coupling amount.

Figure 8:
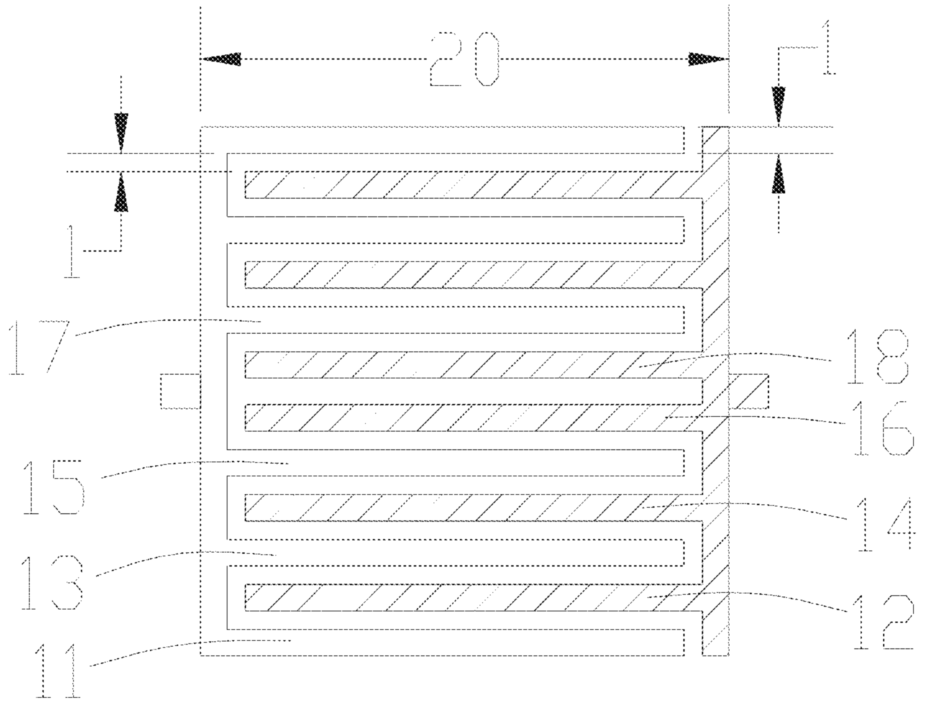
FIG. 8 shows a structural schematic of the coupling structure of another embodiment of the present disclosure, illustrating a plurality of conductor strips of a single layer of conductors and their interrelationships.

Combining with FIG. 8, the conductor strips 12, 14, 16 and 18 shown in the shadow of the figure operate at one electrical potential and the conductor strips 11, 13, 15 and 17 shown in blank operate at another electrical potential. As can be seen from the figure, two adjacent conductor strips 15, 17 operating at the same electrical potential can be provided with two conductor strips 16, 18 operating at another electrical potential between them. A pointing electric field is formed between the conductor strip operating at one electrical potential and an adjacent conductor strip with an opposite electrical potential (i.e., there is a potential difference), and the conductor strips are with a coupling relationship.

In addition, a plurality of conductor strips in the same layer can be subjected to a plurality of voltages so that the electrical potential between the plurality of conductor strips increases in one direction and forms a gradual electric field, thus allowing a coupling relationship to be formed between two adjacent conductor strips and increasing the coupling amount.

In addition, the projections of the corresponding conductor strips of the upper and lower layer may not overlap completely with each other, and the projections between the conductor strips with an electrical potential difference overlap at least partially, which also enables the coupling function.

In summary, in the coupling structure, there is an electrical potential difference between at least one conductor strip and the adjacent conductor strip when operating with an applied voltage, thereby generating an electric field from the conductor strip with a high electrical potential to the conductor strip with a low electrical potential, resulting in a capacitive coupling relationship. Between two different layers of conductor strips, there is an electrical potential difference between at least one of the conductor strips of one layer during operation and at least one of the conductor strips located in the other layer, and there is an overlap area in the projection of each other, which also forms an electric field from the conductor strip with a high electrical potential to the conductor strip with a low electrical potential, forming a capacitive coupling relationship.

Therefore, the coupling structure described in the present disclosure forms an electric field from the higher electrical potential to the lower electrical potential between conductor strips of two different layers, as well as an electric field from the higher electrical potential to the lower electrical potential between neighboring conductor strips of the same layer. Compared to conventional surface coupling structures, the coupling structure of the present disclosure is strip coupling, has more coupling paths, and achieves a larger coupling amount, in other words, when the same coupling amount is achieved, the coupling structure of the present disclosure has a smaller size.

Figure 2A:
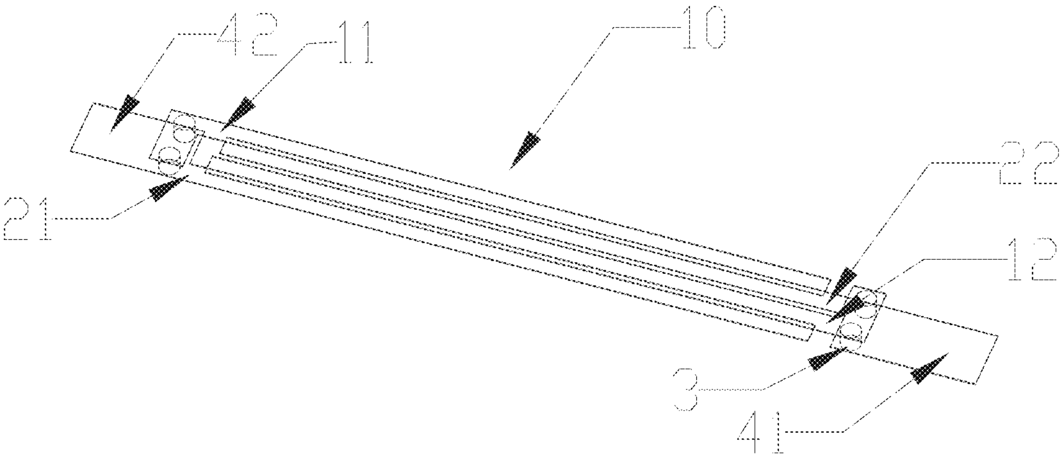
FIG. 2*a* shows a schematic diagram of the structure of the coupling structure provided in one embodiment of the present disclosure.
Figure 2B:
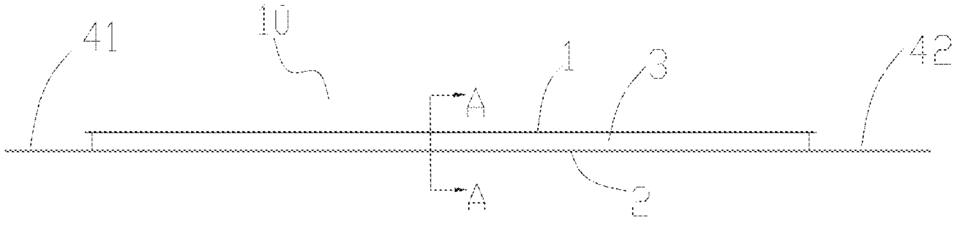
FIG. 2*b* shows a schematic diagram of the structure of the coupling structure provided in another embodiment of the present disclosure.

Combining with FIG. 2*a*, FIG. 2*b* and FIG. 7, optionally, the coupling structure further includes two conductor sections 4 for connecting to an external transmission line to access the voltage of the coupling structure, the conductor sections 4 specifically including a first conductor section 41 and a second conductor section 42, the first conductor section 41 and the second conductor section 42 being provided on one of the surfaces of the dielectric plate 3 and connected to the conductor strip.

In FIG. 2*a*, the conductor strips 11, 21 operating at the high electrical potential are connected to the second conductor section 42, and the conductor strips 12, 22 operating at the low electrical potential are connected to the first conductor section 41. In FIG. 7, the conductor strips 11, 13 operating at the high electrical potential are connected to the second conductor section 42 and the conductor strips 12, 14 operating at the low electrical potential are connected to the first conductor section 41, the conductor strips being arranged alternately in such a way that they have an electrical potential difference between them. Thus, when a voltage is applied to both conductor sections, the conductor strips connected to the second conductor section 42 are both positively charged and the conductor strips connected to the first conductor section 41 are both negatively charged, and the conductor strips with different charges have an electrical potential difference between them, forming a coupling relationship.

As can be seen from the above, the conductor strips are provided in layers on the dielectric plate and are provided with at least two layers, while the conductor sections are provided on the surface of the dielectric plate (i.e. one layer on the surface of the dielectric plate), in order to achieve the supply of energy from the conductor sections to the conductor strips (i.e. the conductor sections provide the required charge to the conductor strips), wherein the conductor strips located on the same layer as the conductor sections are integrally formed with the conductor sections, while the conductor strips not located on the same layer as the conductor sections are connected to the conductor sections via a plated through hole, whereby the conductor strips can be fed by two conductor sections and each layer of conductor has a conductor strip operating at two different operating electrical potentials, high and low electrical potentials, resulting in a simpler circuit layout for the coupling structure.

Preferably, the first conductor section and the second conductor section are located at two ends of the conductor strip to facilitate circuit design by locating the input and output of the circuit at the two ends of the conductor strip when it is applied to the circuit.

In the above example coupling structure, the capacitive coupling relationship is formed between the two conductor layers, which increases the coupling amount by increasing the pointing path of the electric field, reduces the size compared to a coupling structure with wide microstrip lines when achieving the same coupling amount, and reduces the cost by using only a single layer of the circuit board to achieve the coupling amount target compared to a coupling structure with a multi-layer PCB.

As an extension, the coupling structure has a plurality of layers of conductors, the plurality of layers of conductors being stacked in layers along the thickness direction of the dielectric plate. The setting of conductors of each layer and the relationship between two conductors of different layers are the same as in the above embodiment and will not be repeated here. As a result, a coupling relationship can be formed between the conductor strips of every two adjacent layers of conductors, thus allowing a greater coupling amount to be achieved.

The plurality of conductor strips of each layer of conductors may be cut from planar conductors, wherein adjacent conductors have gaps between them and where the sum of the projected areas of the conductor strips along the direction of the conductor lamination is greater than the sum of the projected areas of the gaps between the conductor strips. Optionally, the sum of the widths of the conductor strips on the same layer of conductors is greater than the sum of the widths of the gaps between the conductor strips, such that the area of the removed conductors is less than the newly-added area in which the charge can be carried, thereby allowing a greater coupling amount to be achieved relative to conventional coupling structures.

Combining with FIGS. 9 to 12, as a second aspect, the present disclosure relates to a resonant structure as a practical application of the above coupling structure, which can be applied to an antenna oscillator for radiating a signal. The resonant structure is specifically represented by the above coupling structure 10 connected in series (or in parallel) with the inductor 20 to form an LC series resonant structure (or LC parallel resonant structure), which has the characteristic of conducting at the resonant frequency and presenting a high impedance at off-resonant frequencies, and which, when used in the radiation arm, will give the radiation arm a band-pass filtering characteristic and will also allow the size of the radiation arm to be further reduced.

Figure 9:
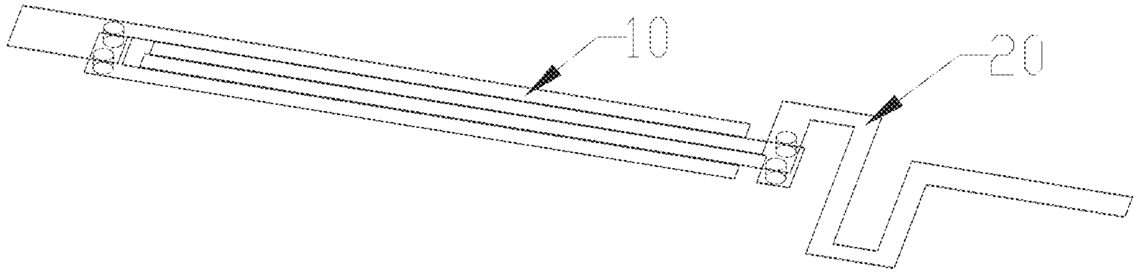
FIG. 9 is a schematic diagram of the structure of the resonant structure of one embodiment of the present disclosure being applied to a linear oscillator.

Referring to FIG. 9, in one embodiment, the inductor is a folded-type inductor, specifically a folded-type conductor with inductive characteristics provided on a dielectric plate, which is connected to one of the conductor sections of the coupling structure to achieve a series connection of the folded-type inductor with the coupling structure.

Figure 10:
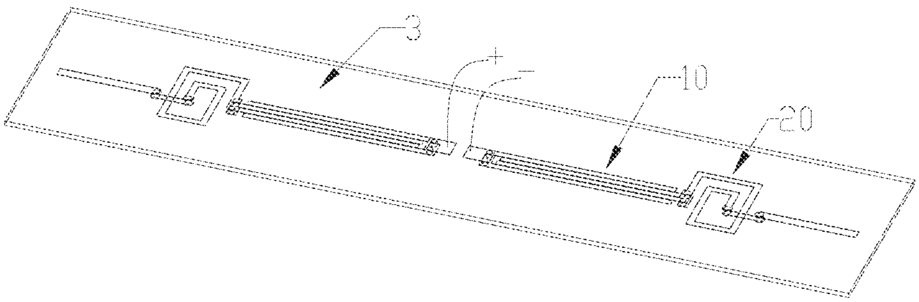
FIG. 10 is a schematic diagram of the structure of the resonant structure of another embodiment of the present disclosure being applied to a linear oscillators.

Referring to FIG. 10, in another embodiment, the inductor is a wraparound-type inductor, specifically a wraparound-type conductor provided on the dielectric plate and having inductive characteristics is connected to one of the conductor sections of the coupling structure to achieve a series connection of the wraparound-type inductor with the coupling structure.

Figure 11:
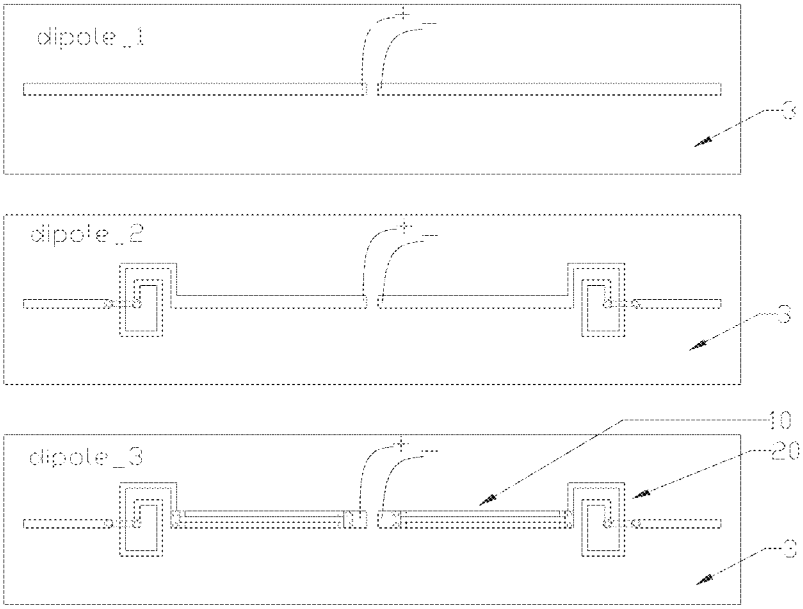
FIG. 11 shows a structural comparison diagram of three linear oscillators.
Figure 12:
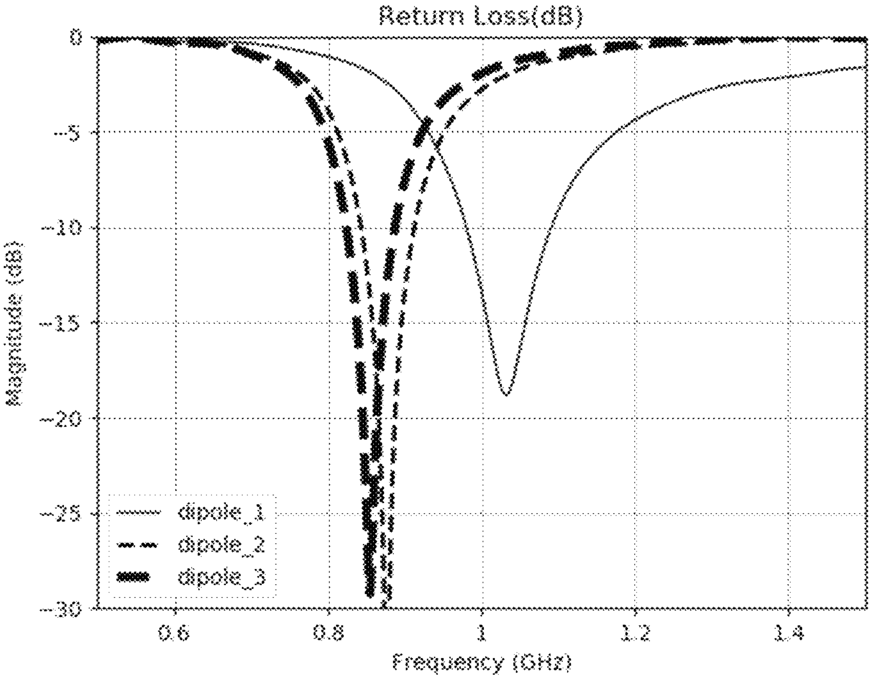
FIG. 12 is a simulation diagram of the return loss of the three linear oscillators shown in FIG. 11.

In order to illustrate the characteristics of the coupling structure of the present disclosure to reduce the size of the radiation arm, three linear symmetrical oscillators are compared below, as shown in FIG. 11, setting three calculation models diople_1, dipole_2 and dipole_3 with the same length, where diople_1 is a conventional symmetrical oscillator, dipole_2 is a symmetrical oscillator loaded with a wraparound-type inductor, the dipole_3 is a symmetrical oscillator loaded with the LC series resonant circuit consisting of the coupling structure of the present disclosure and a wraparound-type inductor, and the parameters of the dielectric plate 3 used for the three types of oscillators are limited to the same, and the return loss calculated by the simulation software is shown in FIG. 12. As can be seen from FIG. 12, the symmetrical oscillator using the coupling structure of the present disclosure plus the wraparound-type inductor has the lowest resonant frequency, which also means that the structure of the dipole_3 can have the smallest size if a symmetrical oscillator with the same resonant frequency is designed.

Figure 13:
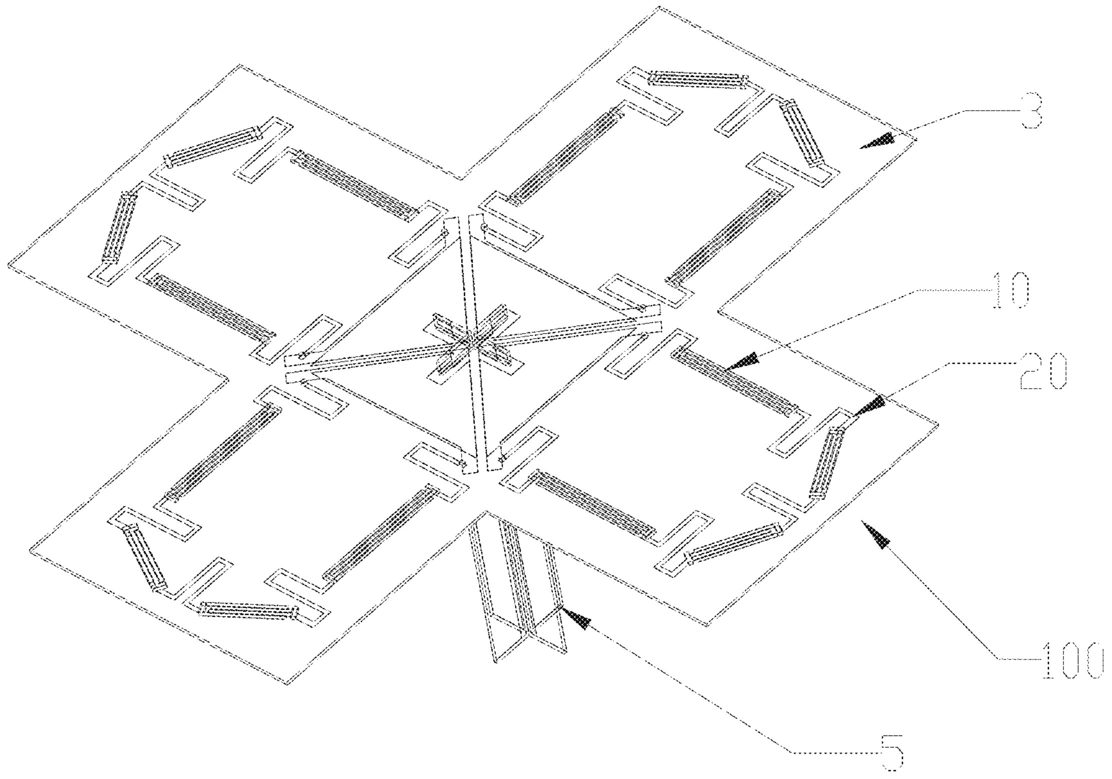
FIG. 13 is a three-dimensional diagram of a low frequency radiation unit of one embodiment of the present disclosure.
Figure 14:
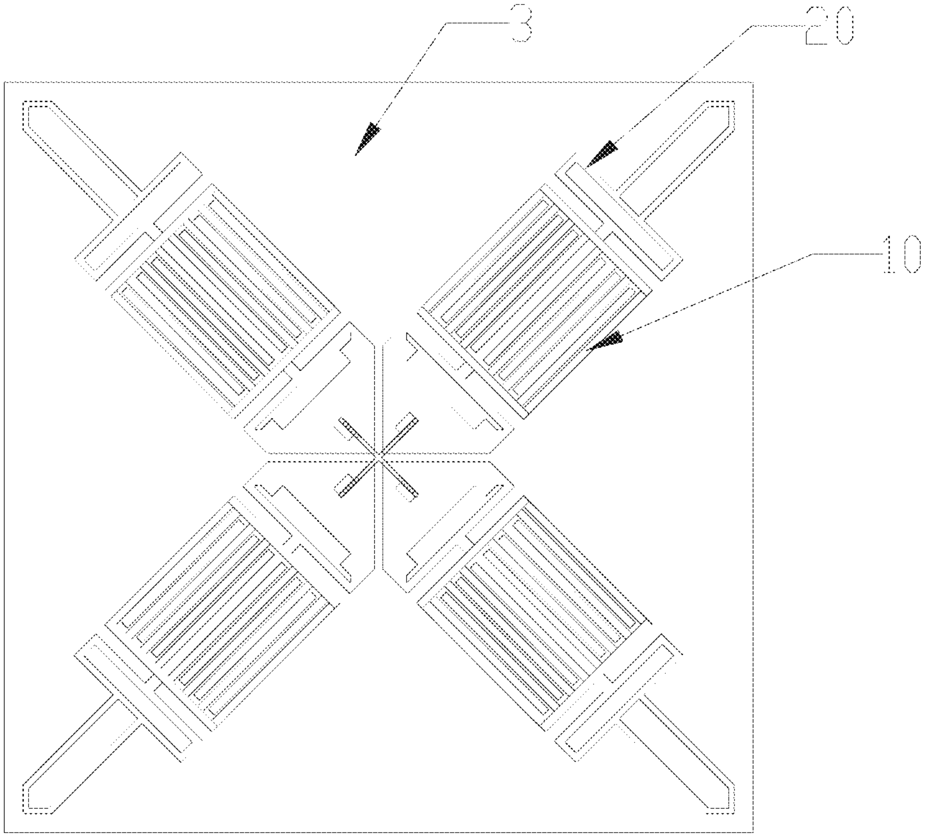
FIG. 14 is a schematic diagram of the radiation surface of a low frequency radiation unit of another embodiment of the present disclosure.
Figure 15:
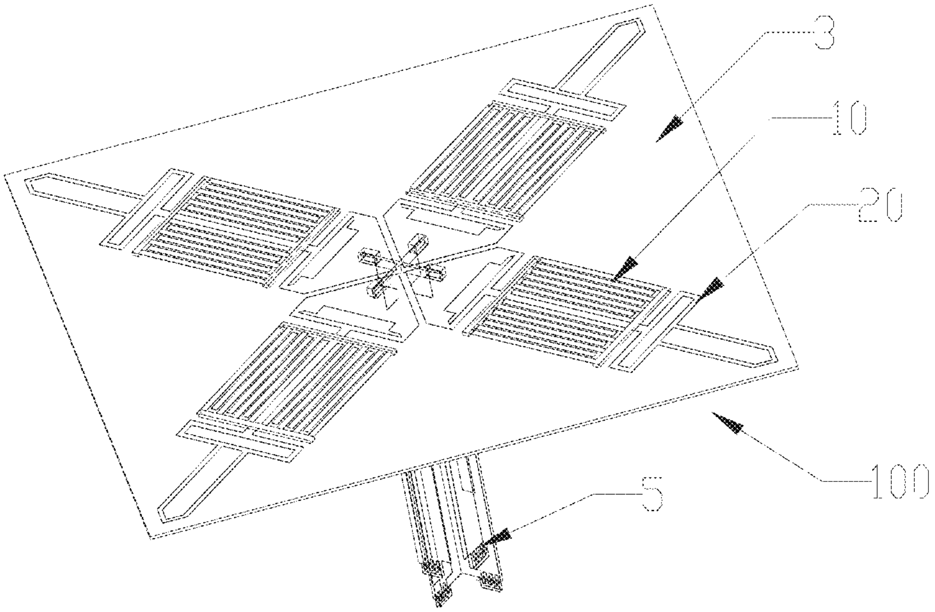
FIG. 15 is a three-dimensional diagram of the low frequency radiation unit shown in FIG. 14.

Combining with FIGS. 13 to 15, as a third aspect, the present disclosure relates to a low frequency radiation unit including a radiation surface and a feed barron 5 for supporting and feeding the radiation surface, wherein the radiation surface includes four radiation arms arranged as a cross, the radiation arms being preferably annular radiation arms, which are formed by jointing the resonant structure as described above.

Wherein, in the low frequency radiation unit shown in FIG. 13, the single coupling structure has four conductor strips: in the low frequency radiation unit shown in FIG. 15, the single coupling structure has eight conductor strips, allowing for a greater coupling amount relative to a coupling structure with four conductor strips.

By using the above resonant structure as a constituent element of the radiation arm of the low frequency radiation unit, the resonant frequency is lower compared to that of the radiation arm with a conventional resonant structure, thus reducing the size of the radiation arm and facilitating the miniaturization of the antenna.

Figure 20:
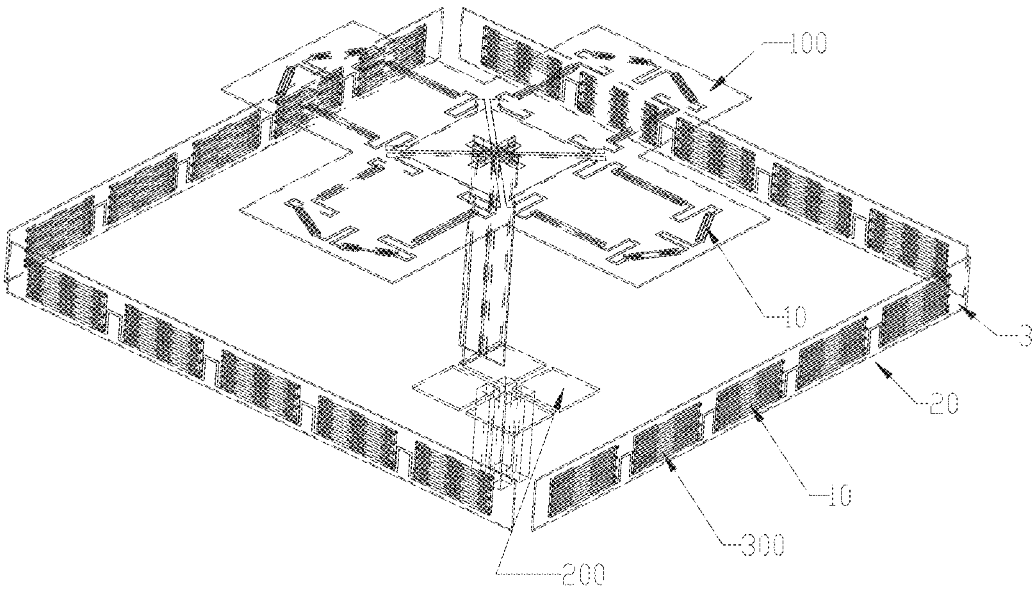
FIG. 20 shows a schematic diagram of the structure of an antenna of an embodiment of the present disclosure.

Referring to FIG. 20, as a fourth aspect, the present disclosure also relates to an antenna 1000 including the above low frequency radiation unit 100, a high-frequency radiation unit 200 and an electromagnetic boundary 300, wherein the high-frequency radiation unit is provided between two adjacent low frequency radiation units, and/or the high-frequency radiation unit is provided between two adjacent radiation arms of the low frequency radiation unit, and the electromagnetic boundary 300 is provided around the low frequency radiation unit 100 and configured to reduce the interference between the radiation units and enhance the radiation performance of the antenna.

By using the above resonant structure as a constituent element of the radiation arm of the low frequency radiation unit, the resonant frequency is lower than that of the radiation arm with conventional resonant structure, thus reducing the size of the radiation arm and facilitating the miniaturization of the antenna.

In addition, when the bandpass characteristics of the electromagnetic boundary are configured to be the same as those of the low frequency radiation unit 100, which presents the high resistance characteristics in the frequency band of the high frequency radiation unit, the performance of the low frequency radiation unit can be improved while the effect on the high frequency radiation unit can be attenuated.

Furthermore, the coupling structures of the present disclosure can also be applied in electromagnetic boundaries, therefore, combining with FIGS. 16 to 19, as a fifth aspect, the present disclosure also provides electromagnetic boundaries applying the above resonant structures, which are formed by jointing a plurality of the above resonant structures, for being provided between the radiation units to reduce the interference between the radiation units and to enhance the radiation performance of the antenna.

Figure 16:
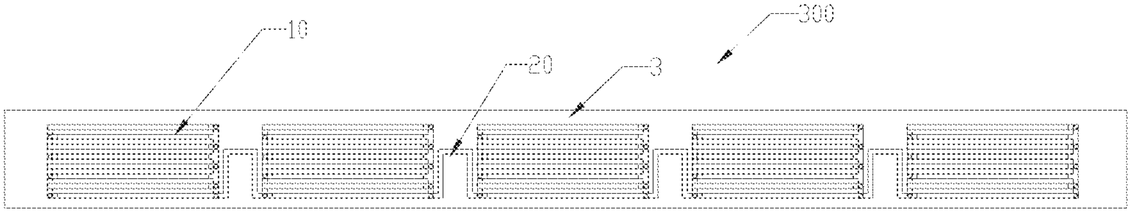
FIG. 16 shows a schematic diagram of the structure of the electromagnetic boundary of one embodiment of the present disclosure.
Figure 17:
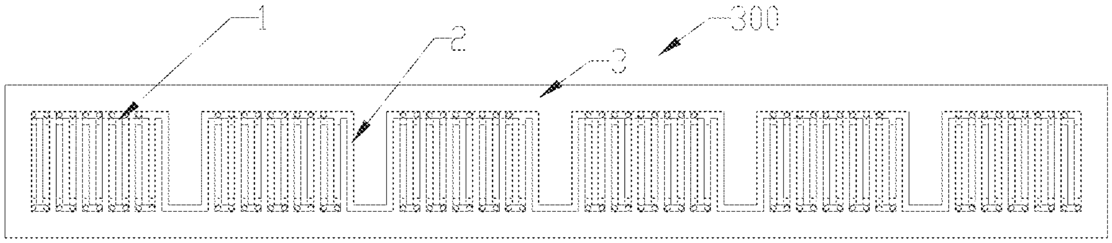
FIG. 17 shows a schematic diagram of the structure of the electromagnetic boundary of another embodiment of the present disclosure.

In the electromagnetic boundary shown in FIG. 16, the coupling structure has a dielectric plate, wherein the length direction of the conductor strip is parallel to the length direction of the dielectric plate: and in the electromagnetic boundary shown in FIG. 17, the coupling structure has a dielectric plate, wherein the length direction of the conductor strip is perpendicular to the length direction of the dielectric plate. In other words, the electromagnetic boundary of the present disclosure allows the extension direction of the conductor strip to be set by the technician according to practical needs in order to use the space of the dielectric plate reasonably and to facilitate the line design.

Figure 18:
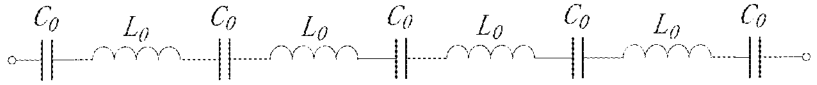
FIG. 18 shows an equivalent circuit diagram of the electromagnetic boundary of the present disclosure.
Figure 19:
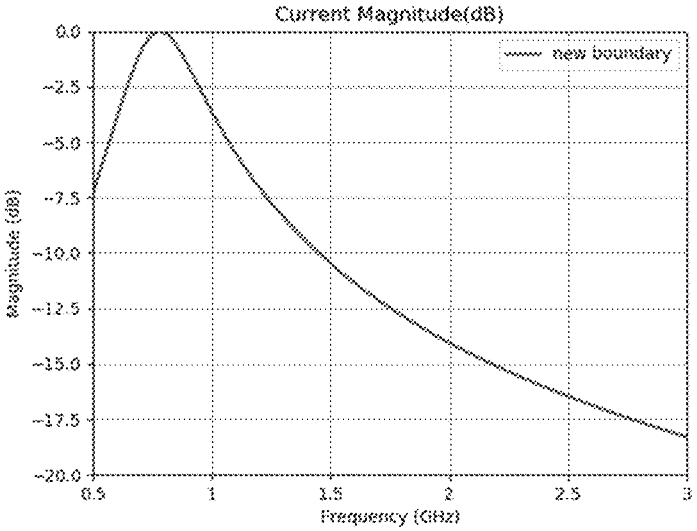
FIG. 19 shows a frequency response graph of the electromagnetic boundary of the present disclosure.

As the inductance in the equivalent circuit of the coupling structure of the present disclosure is small (much smaller than the inductance value of the folded-type inductor), the practical application mainly presents capacitive characteristics, and the equivalent circuit after connection with the folded-type inductor is shown in FIG. 18. The electromagnetic boundary of the present disclosure can be considered as a cascade of a plurality of resonant structures. The frequency response characteristics of the circuit are shown in FIG. 19. The presented bandpass characteristics of the electromagnetic boundary allow the new electromagnetic boundary to be used in multi-band antennas to improve the radiation unit index of a particular frequency band.

The above description is only a preferred embodiment of the present disclosure and an illustration of the technical principles employed. It should be understood by those skilled in the art that the scope of the present disclosure covered by the present disclosure is not limited to the technical solutions resulting from a particular combination of the above technical features, but should also cover other technical solutions resulting from any combination of the above technical features or their equivalent, without departing from the above inventive concept. For example, technical solutions resulting from the interchange of the above features with technical features having similar functions as those invented in the present disclosure (but not limited to).

Although the present subject matter has been described in language specific to structural features and/or methodological logical actions, it should be understood that the subject matter defined in the appended claims is not necessarily limited to the particular features or actions described above. Rather, the particular features and actions described above are merely exemplary forms of claim fulfillment.

What is claimed is:

1. A coupling structure, comprising at least two layers of conductors in a capacitive coupling relationship, wherein, each layer of conductors comprises a plurality of conductor strips side by side and having a gap, wherein at least one of the plurality of conductor strips of the same layer has an electrical potential difference from an adjacent conductor strip during operation, and wherein between the plurality of conductor strips of two different layers, at least one of the plurality of conductor strips of one layer of the two different layers has an electrical potential difference from at least one of the plurality of conductor strips of the other layer, and the two different layers at least partially overlap in a direction of a mutual projection with each other;

wherein, the plurality of conductor strips of each layer of conductors operate at two relative electrical potentials, a high electrical potential and a low electrical potential, with part of the plurality of conductor strips operating at the high electrical potential and the other part of the plurality of conductor strips having a coupling relationship with them operating at the low electrical potential; and wherein, the conductor strip operating at the high electrical potential is connected to one conductor section, and the conductor strip operating at the low electrical potential is connected to another conductor section.

2. The coupling structure according to claim 1, wherein, further comprising a dielectric plate, each layer of conductors being laminated in a thickness direction of the dielectric plate, each of the conductor section being provided on a surface of the dielectric plate, the conductor section being integrally formed with a conductor strip located on the same layer thereof and operating at the same electrical potential, and being electrically connected to a conductor strip located on a different layer thereof and operating at the same electrical potential via a plated through hole.

3. The coupling structure according to claim 1, wherein, the two conductor sections are disposed at the two ends of the conductor strip.

4. The coupling structure according to claim 1, wherein, there is an electrical potential difference between every two adjacent conductor strips operating at different electrical potentials respectively in the plurality of conductor strips of the same layer.

5. The coupling structure according to claim 1, wherein, in the conductor strips of the same layer, at least two conductor strips operating at one electrical potential are provided between two conductor strips operating at another electrical potential.

6. The coupling structure according to claim 1, wherein, the number of conductor strips operating at a high electrical potential is the same as or different from the number of conductor strips operating at a low electrical potential.

7. The coupling structure according to claim 1, wherein, along a lamination direction of the layers of the plurality of conductor strips, a sum of projected areas of the plurality of conductor strips is greater than a sum of projected areas of gaps between the plurality of conductor strips.

8. The coupling structure according to claim 7, wherein, for a same layer of conductors, a sum of widths of the plurality of conductor strips is greater than a sum of widths of the gaps between the plurality of conductor strips.

9. A resonant structure comprising a capacitor and an inductor, the capacitor being connected in series or parallel with the inductor, wherein, the capacitor comprises the coupling structure according to claim 1.

10. The resonant structure according to claim 9, wherein, the inductor comprises a folded-type conductor or a wrap-around-type conductor provided on a dielectric substrate.

11. A low frequency radiation unit comprising a radiation arm, wherein, the radiation arm comprises the resonant structure according to claim 9.

12. The low frequency radiation unit according to claim 11, wherein, the radiation arm is a ring-shaped radiation arm formed by joining a plurality of the resonant structures.

13. An antenna, comprising a low frequency radiation unit, wherein, the low frequency radiation unit is a low frequency radiation unit according to claim 11.

14. The antenna according to claim 13, wherein, the antenna further comprises a high frequency radiation unit, the high frequency radiation unit being provided between two adjacent low frequency radiation units, and/or, the high frequency radiation unit being provided between two adjacent radiation arms of the low frequency radiation unit.

15. The antenna according to claim 14, wherein, the antenna further comprises an electromagnetic boundary, the electromagnetic boundary being provided around the low frequency radiation unit.

16. The antenna according to claim 15, wherein, the electromagnetic boundary is composed by jointing a plurality of resonant structures.

17. An electromagnetic boundary, configured for being provided between radiation units to avoid interference between radiation units, wherein, the electromagnetic boundary comprises a resonant structure according to claim 9.

* * * * *